(12) United States Patent
Sugimoto

(10) Patent No.: US 6,630,252 B1
(45) Date of Patent: Oct. 7, 2003

(54) MAGNETO-OPTICAL RECORDING MEDIUM COMPRISING FOUR MAGNETIC LAYERS

(75) Inventor: Toshio Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 09/628,498

(22) Filed: Jul. 28, 2000

(30) Foreign Application Priority Data

Sep. 30, 1999 (JP) .......................................... 11-278392

(51) Int. Cl.[7] .......................................... G11B 11/105
(52) U.S. Cl. ........................ 428/668; 428/212; 428/332; 428/694 MM; 428/694 RE; 428/900; 369/13.42; 369/13.43; 369/13.44; 369/13.45; 369/13.46; 369/13.53
(58) Field of Search .................. 428/694 MM, 428/694 RE, 694 EC, 900, 212, 668, 332, 694 SC; 369/13.42, 13.43, 13.44, 13.45, 13.46, 13.53

(56) References Cited

U.S. PATENT DOCUMENTS 5,623,458 A  4/1997  Matsumoto et al.
5,740,133 A * 4/1998 Tamanoi et al. ............... 369/13
6,124,048 A * 9/2000 Becker ................ 428/694 MM

FOREIGN PATENT DOCUMENTS

| JP | 5298764 | 11/1993 |
| JP | 7244877 | 9/1995 |
| JP | 10134429 | 5/1998 |

* cited by examiner

Primary Examiner—Stevan A. Resan
Assistant Examiner—Kevin M. Bernatz
(74) Attorney, Agent, or Firm—Greer, Burns & Crain, Ltd.

(57) ABSTRACT

An MO disk includes a readout layer, an intermediate layer and a recording layer each of which is made of a rare earth-transition metal amorphous material. The MO disk also includes a fourth magnetic layer formed on the recording layer and made of a rare earth-transition metal amorphous magnetic material containing Gd. The fourth magnetic layer has a rare earth metal magnetization-dominant composition and an axis of easy magnetization oriented longitudinally at room temperature. The axis of easy magnetization is changed to be oriented perpendicularly to the fourth magnetic layer as the temperature of the fourth magnetic layer rises to the Curie temperature of the fourth magnetic layer.

10 Claims, 7 Drawing Sheets

FIG.2

| FOURTH MAGNETIC LAYER | COMPEN-SATION TEMPERA-TURE (°C) | Tc4(°C) | TRANSITION TEMPERATURE (°C) | | DOMINANCE |
|---|---|---|---|---|---|
| | | | LON→PER | PER→LON | |
| 1. $Gd_{28.6}Fe_{60.0}Co_{11.4}$ | 200 | 270 | 90 | — | RE-rich |
| 2. $Gd_{25.1}Fe_{64.4}Co_{10.5}$ | 60 | 290 | — | 260 | RE-rich (COMP.) |
| 3. $Gd_{21.9}Fe_{65.6}Co_{12.5}$ | — | 300 | — | 120 | TM-rich |
| 4. $Gd_{28.5}Fe_{70.6}Co_{2.0}$ | — | 225 | 90 | — | RE-rich |
| 5. $Gd_{25.3}Fe_{72.8}Co_{1.9}$ | 150 | 230 | — | — | RE-rich |
| 6. $Gd_{23.8}Fe_{74.4}Co_{1.8}$ | 40 | 220 | — | — | RE-rich (COMP.) |
| 7. $Gd_{30.2}Fe_{67.1}Co_{2.7}$+Si | — | 180 | 120 | — | RE-rich |
| 8. $Gd_{24.2}Fe_{73.8}Co_{2.1}$+Si | — | 170 | — | 160 | TM-rich (COMP.) |
| 9. $Gd_{20.1}Fe_{78.3}Co_{1.6}$+Si | — | 180 | — | 70 | TM-rich |

(COMP. for COMPENSATION)

ERASING MAGNETIC FIELD

RECORDING MAGNETIC FIELD

MAGNETO-OPTICAL RECORDING MEDIUM COMPRISING FOUR MAGNETIC LAYERS

BACKGROUND OF THE INVENTION

1. Field of the Invention

The present invention relates to a magneto-optical recording medium. In particular, it relates to a magneto-optical recording medium of the type which shows improved sensitivity to the data-recording magnetic field and also exhibits improved readout C/N characteristics.

2. Description of the Related Art

Conventionally, various kinds of magnetic media that can be written to repeatedly (such as hard disks, floppy disks, magneto-optical disks and tapes) have been widely used for storing data. Among them, magneto-optical disks (simply called "MO disks" hereinafter) are advantageous in data retention since they will deteriorate (demagnetize) more slowly than the other kinds of magnetic media mentioned above.

As is known, a technique called "Magnetically-Induced Super Resolution (MSR)" may be used for realizing a high-density data-reproducing (readout) performance. According to this technique, data can be read out from an MO disk in which minute recording marks are arranged along the tracks by a pitch which is smaller than the diameter of the spot of the laser beam irradiated on the MO disk.

An MSR technique is disclosed in JP-A-7(1995)-244877 for example. This document teaches the use of "double-mask RAD (Rear Aperture Detection)" for reading data from an MO disk. By this method, cross talk between adjacent tracks can be minimized.

Referring to FIGS. 9–11 of the accompanying drawings, the double-mask RAD method and the typical layer structure of an MO disk used for implementing this method will be described below.

As shown in FIG. 9, the conventional MO disk includes a readout layer 31, an intermediate layer 32 and a data-recording layer 33. These layers, which are made of a rare earth-transition metal amorphous alloy, are supported by a transparent resin substrate 20 made of e.g. polycarbonate. Thought not illustrated, the MO disk includes additional layers made of SiN (silicon nitride) for protection purposes. Laser beams, emitted on the side of the transparent substrate 20 for erasing, recording or reading data, will pass through the substrate 20 and strike on the readout layer 31.

The readout layer 31 has a transition metal magnetization-dominant composition (hereinafter called "TM-rich" composition). The direction of magnetism of the layer 31 is oriented perpendicularly to this layer. The intermediate layer 32 has a rare earth magnetization-dominant composition (hereinafter called "RE-rich" composition). At room temperature, the direction of magnetism of the intermediate layer 32 is oriented longitudinally thereof, whereas at higher temperatures, the direction is perpendicular. This means that the direction of magnetism of the intermediate layer 32, which is longitudinal at room temperature, is changed to be perpendicular at a certain temperature higher than the room temperature. The data-recording layer 33 has a TM-rich composition, and its direction of magnetism is perpendicular.

When the Curie temperatures of the three layers 31, 32 and 33 are Tc1, Tc2 and Tc3, respectively, the following relations hold:

Tc2<Tc1 and Tc2<Tc3.

Further, when the coercivities of the readout layer 31 and the data-recording layer 33 are Hc1 and Hc3, respectively, the following relations hold:

Hc3>Hc1.

The deletion of recording marks formed on the magneto-optical disk 10 is performed in the following manner. First, as shown in FIG. 10, the readout layer 31 is irradiated with a laser beam when the MO disk is held in a downward, data-deleting magnetic field. Thus, the irradiated area on the layer 31 and portions of the three layers 31–33 adjacent to the irradiated area are heated up to a temperature above the the Curie temperature Tc3. In this state, the direction of the magnetic domains on the data-recording layer 31 is aligned with the direction of the data-deleting magnetic field.

Then, the heated portions of the three layers 31–33 are brought away from the laser beam to cool down to the room temperature. Consequently, the direction of the cooled magnetic domains on the intermediate layer 32 becomes longitudinal of the layer 32 (horizontal in the figure). Thereafter, the readout layer 31 and the data-recording layer 33 are magnetically bonded to each other by weak force. Thus, all of the magnetic domains of the respective layers 31 and 33 are aligned in one direction (downward in FIG. 10). This means that the previous data stored in the data-recording layer 33 has been deleted.

Once the previous data is deleted, new data can be written to the MO disk by a Light Intensity Modulation (LIM) method. Specifically, as shown in FIG. 11, the readout layer 31 is irradiated with a laser beam when the MO disk is put in an upward, data-recording magnetic field. According to the LIM method, the intensity of the laser beam is modulated in accordance with the data to be recorded, while the MO disk is kept in the data-recording magnetic field. Thus, only when the intensity of the laser beam is high, the direction of the irradiated magnetic domains on the recording magnetic layer 33 is aligned with the upward data-recording magnetic field. In this manner, appropriate recording marks are produced.

When the laser-heated region on the MO disk is brought away from the laser beam, it cools down to the room temperature. As a result, the direction of the cooled magnetic domain of the intermediate layer 32 is horizontally directed, thereby rendering the readout layer 31 and the data-recording layer 33 magnetically bonded to each other with weak force.

In the above state, the direction of the magnetic domains of the readout layer 31 can be aligned in one direction upon application of an external magnetic field which is stronger than the above-mentioned weak magnetic force bonding the readout layer 31 to the data-recording layer 33.

Instead of the LIM method described above, Magnetic Field Modulation (MFM) may be used for writing data to the MO disk. According to this method, the direction of the applied magnetic field is modulated (reoriented upward and downward repeatedly) in accordance with the data to be recorded, while the readout layer 31 is being irradiated with a laser beam. In this manner, the direction of the laser-irradiated magnetic domains is aligned with the direction of the applied magnetic field.

The thus recorded data is read out from the MO disk in the following manner. As shown in FIG. 9, the readout layer 31 is irradiated with a laser beam S, while the laser-irradiated region is put in a downward, data-readout magnetic field. In the low-temperature region (hatched region) corresponding to a front portion of the laser beam S, the intermediate layer 32 and the data-recording layer 33 are only weakly bonded to each other, so that the direction of the magnetic domains of the intermediate layer 32 is aligned with the externally applied readout magnetic field. Then, due to the exchange interaction between the intermediate layer 32 and the readout layer 31, the direction of the magnetic domains of the readout layer 31 is directed upward. In this manner, the direction of the magnetic domains of the data-recording layer 33 is masked (front mask) by the readout layer 31.

The temperature of the high-temperature region (crosshatched region) corresponding to a rear portion of the laser beam S is higher than the Curie temperature of the intermediate layer 32, thereby breaking the exchange interaction between the intermediate layer 32 and the readout layer 31. Thus, the direction of the magnetic domains of the readout layer 31 is aligned with the direction of the externally applied readout magnetic field. Thus, the direction of the magnetic domains of the data-recording layer 33 is masked (rear mask).

In the intermediate-temperature region between the low-temperature region and the high-temperature region (i.e., the region between the hatched region and the crosshatched region), the exchange interaction between the data-recording layer 33 and the readout layer 31 causes the direction of the magnetic domains of the readout layer 31 to be copied to the magnetic domains of the data-recording layer 33.

As described above, when the MO disk is irradiated by the laser beam for reading out the stored data, both the low-temperature region and the high-temperature region within the laser spot S are masked, while the intermediate-temperature region is left unmasked. This intermediate-temperature region serves as an aperture from which the recorded data can be read out. As viewed along the tracks on the MO disk, the aperture has a length L which is smaller than the diameter of the laser spot S. Thus, it is possible to read the recorded data based on the minute recording marks arranged in the track by a pitch smaller than the diameter of the laser spot S. Further, the width W of the intermediate-temperature region is smaller than the width (diameter) of the laser spot S, whereby the cross talk between adjacent tracks is advantageously reduced.

To improve the performance of the MO disk described above, it is necessary to improve the sensitivity to the recording magnetic field and also to improve the readout C/N characteristics. When the sensitivity to the recording magnetic field is improved, it is possible to use a weaker magnetic field for recording and deleting data by the LIM method. The use of a weaker magnetic field leads to the downsizing of the unit and improvement of the energy efficiency. When the data-recording is performed by the MFM, the improvement of the sensitivity to the recording magnetic field will result in proper recording mark formation even if the recording magnetic field is weakened by drop in effective current due to high frequency loss. Thus, with the improvement of the sensitivity to the recording magnetic field, it is possible to perform high density data-recording by increasing the frequency of the recording magnetic field.

JP-A-5(1993)-298764 discloses an MSR MO disk by FAD (Front Aperture Detection). This conventional MO disk is provided with a recording layer made of magnetic materials which have an RE-rich composition at room temperature. A magnetic layer is formed on the recording layer for improving the sensitivity to the recording magnetic field. This magnetic layer is made of materials which have a TM-rich composition at a temperature of forming recording marks on the recording layer.

However, according to the teaching of JP-A-5(1993)-298764, it is impossible to satisfactorily reduce the length of the data-reading aperture along the tracks since the conventional MO disk employs the FAD method. Therefore, even if the sensitivity to the recording magnetic field is improved and high-density formation of recording marks by magnetic field modulation is possible, the high-density recording marks cannot be properly read out from the disk. Further, in the conventional MO disk, the readout C/N is not improved.

SUMMARY OF THE INVENTION

It is, therefore, an object of the present invention to provide a magneto-optical recording medium capable of forming recording marks with higher density by magnetic field modulation.

Another object of the present invention is to make it possible to properly read out the high-density recording marks from the MO recording medium by MSR.

Still another object of the present invention is to improve the readout C/N with the MO recording medium.

According to a first aspect of the present invention, there is provided a magneto-optical recording medium for super resolution readout by double mask RAD. The MO recording medium includes four magnetic layers, namely, first to fourth magnetic layers. The first magnetic layer serves as a readout layer and is made of a rare earth-transition metal amorphous magnetic material. The Curie temperature of the first magnetic layer is Tc1.

The second magnetic layer serves as an intermediate layer and is made of a rare earth-transition metal amorphous magnetic material. The second magnetic layer has a rare earth metal magnetization-dominant composition and an axis of easy magnetization which is oriented longitudinally of the second magnetic layer at room temperature. The second magnetic layer has no compensation temperature below a Curie temperature Tc2 of the second magnetic layer.

The third magnetic layer serves as a recording layer and is made of a rare earth-transition metal amorphous magnetic material. The third magnetic layer has a transition metal magnetization-dominant composition or compensation composition at room temperature. The Curie temperature of the third magnetic layer is Tc3.

The fourth magnetic layer is formed on the third magnetic layer and is made of a rare earth-transition metal amorphous magnetic material containing at least Gd. The fourth magnetic layer has, at room temperature, a rare earth metal magnetization-dominant composition and an axis of easy magnetization which is oriented longitudinally of the fourth magnetic layer. The axis of easy magnetization of the fourth magnetic layer is altered in direction to be oriented perpendicularly to the fourth magnetic layer as the temperature of the fourth magnetic layer rises to the Curie temperature Tc4 of the fourth magnetic layer.

According to a preferred embodiment, the Curie temperatures Tc1, Tc2, Tc3 and Tc4 may be determined so that $Tc2 \leq Tc4 \leq Tc3 < Tc1$, and $Tc2 < Tc3$.

According to another preferred embodiment, the Curie temperatures Tc1, Tc2, Tc3 and Tc4 may be determined so that $Tc2 < Tc3 \leq Tc4 \leq Tc1$, and $Tc3 < Tc1$.

Preferably, the fourth magnetic layer may contain 25–35 at % of Gd. Further, the fourth magnetic layer may have a thickness of no greater than 20 nm.

According to a second aspect of the present invention, there is provided a magneto-optical recording medium for super resolution readout by double mask RAD. This MO recording medium includes four magnetic layers, namely, first to fourth magnetic layers. The first magnetic layer serves as a readout layer and is made of a rare earth-transition metal amorphous magnetic material. The Curie temperature of the first magnetic layer is Tc1.

The second magnetic layer serves as an intermediate layer and is made of a rare earth-transition metal amorphous magnetic material. The second magnetic layer has a rare earth metal magnetization-dominant composition and an axis of easy magnetization which is oriented longitudinally of the second magnetic layer at room temperature. The second magnetic layer has no compensation temperature below the Curie temperature Tc2 of the second magnetic layer.

The third magnetic layer serves as a recording layer and is made of a rare earth-transition metal amorphous magnetic material. The third magnetic layer has a transition metal magnetization-dominant composition or compensation composition at room temperature. The Curie temperature of the third magnetic layer is Tc3.

The fourth magnetic layer is formed on the third magnetic layer and made of a rare earth-transition metal amorphous magnetic material containing at least Gd. The fourth magnetic layer has, at room temperature, a transition metal magnetization-dominant composition and an axis of easy magnetization which is oriented perpendicularly to the fourth magnetic layer. The axis of easy magnetization of the fourth magnetic layer is altered in direction to be oriented longitudinally of the fourth magnetic layer as the temperature of the fourth magnetic layer rises to the Curie temperature Tc4 of the fourth magnetic layer.

Preferably, at about the Curie temperature Tc3, the third and the fourth magnetic layers may have coercivity Hc3 and coercivity Hc4, respectively. The coercivities Hc3, Hc4 and the recording magnetic field Hw may be determined so that Hc3<Hw and Hc4<Hw.

In the second aspect of the present invention again, the Curie temperatures Tc1, Tc2, Tc3 and Tc4 may be determined so that Tc2≦Tc4≦Tc3<Tc1, and Tc2<Tc3. Or, the Curie temperatures Tc1, Tc2, Tc3 and Tc4 may be determined so that Tc2<Tc3≦Tc4≦Tc1, and Tc3<Tc1.

Preferably, the fourth magnetic layer may contain 25–35 at % of Gd. Further, the fourth magnetic layer may have a thickness of no greater than 20 nm.

In an MO recording medium according to the present invention, the magnetic properties of each of the first to the third magnetic layers are determined so that super-resolution readout can be performed by the double mask RAD method.

Further, according to the present invention, a fourth magnetic layer is formed on the third magnetic layer (recording layer). Specifically, the third magnetic layer has two principal surfaces: a first surface closer to the transparent substrate carrying the stack of the first to the third magnetic layers; and a second surface farther from the transparent substrate. The fourth magnetic layer is arranged on the second surface of the third magnetic layer. With the fourth magnetic layer provided, the sensitivity to the recording magnetic field as well as the readout C/N is advantageously improved.

The reason why the sensitivity to the recording magnetic field is improved in the MO recording medium according to the first aspect of the present invention may be as follows. In magnetizing the third magnetic layer (recording layer) in the direction of the recording magnetic field, the axis of easy magnetization of the fourth magnetic layer is oriented perpendicularly to the fourth layer when the temperature of the fourth layer is raised to a certain point. Consequently, the third magnetic layer is put in the biased static magnetic field generated by the fourth magnetic layer. Thus, upon application of a relatively weak recording magnetic field, the magnetization of the third magnetic layer will reach its saturation point. This means that the sensitivity to the recording magnetic field is improved.

The reason why the readout C/N is improved in the MO recording medium according to the first aspect of the present invention may be as follows. In reading out the stored data from the MO recording medium, the first magnetic layer (readout layer) of the MO recording medium is irradiated with a laser beam. Thus, as previously stated, an intermediate-temperature region will be produced in the magnetic layers of the MO recording medium. Corresponding to this intermediate-temperature region, each of the third and the fourth magnetic layers is provided with an intermediate-temperature portion. It is possible, by having properly adjusted the Curie temperature Tc4 of the fourth magnetic layer, to align the magnetization direction of the intermediate-temperature portion of the third magnetic layer with the magnetization direction of the intermediate-temperature portion of the fourth magnetic layer. Consequently, the magnetic exchange bonding force between the first magnetic layer and the third magnetic layer via the second magnetic layer is enhanced. Thus, the magnetization direction of the third magnetic layer can be copied to the first magnetic layer more properly than is conventionally possible. This means that the readout C/N is improved.

The reason why the sensitivity to the recording magnetic field is improved in the MO recording medium according to the second aspect of the present invention may be as follows. In magnetizing the third magnetic layer (recording layer) in the direction of the recording magnetic field, the axis of easy magnetization of the fourth magnetic layer has a component which is longitudinal of the fourth layer when the temperature of the fourth layer is raised to a certain point. Consequently, the magnetic domains of the fourth layer are stabilized. Thus, upon application of a relatively weak recording magnetic field, the magnetization of the third magnetic layer will reach its saturation point. This means that the sensitivity to the recording magnetic field is improved.

The reason why the readout C/N is improved in the MO recording medium according to the second aspect of the present invention may be as follows. In reading out data from the MO recording medium, a properly-adjusted Curie temperature Tc4 of the fourth magnetic layer can cause the axis of easy magnetization of the intermediate-temperature portion of the fourth layer to be oriented longitudinal of the fourth layer. As a result, the magnetic domains of the fourth layer are rendered stronger, which in turn serves to enhance the magnetic exchange bonding force between the first magnetic layer and the third magnetic layer via the second magnetic layer. Thus, the magnetization direction of the third magnetic layer can be copied to the first magnetic layer more properly than is conventionally possible. This means that the readout C/N is improved.

In summary, according to the present invention, the sensitivity to the recording magnetic field is advantageously improved. Thus, high-density data recording by high-frequency magnetic field modulation can be performed, while also achieving improvement of the readout C/N. Further, when data-recording and data-deleting are performed by light intensity modulation, a weaker recording magnetic field suffices. This serves to downsize a magneto-optical disk apparatus, while also helping to save power supplied to the apparatus.

Other features and advantages of the present invention will become apparent from the detailed description given below with reference to the accompanying drawings.

BRIEF DESCRIPTION OF THE DRAWINGS

FIG. 2 is a table showing several compositions of the fourth magnetic layer together with magnetic properties associated with the respective compositions;

DETAILED DESCRIPTION OF THE PREFERRED EMBODIMENTS

The preferred embodiment of the present invention will be described below with reference to the accompanying drawings.

Figure 1:
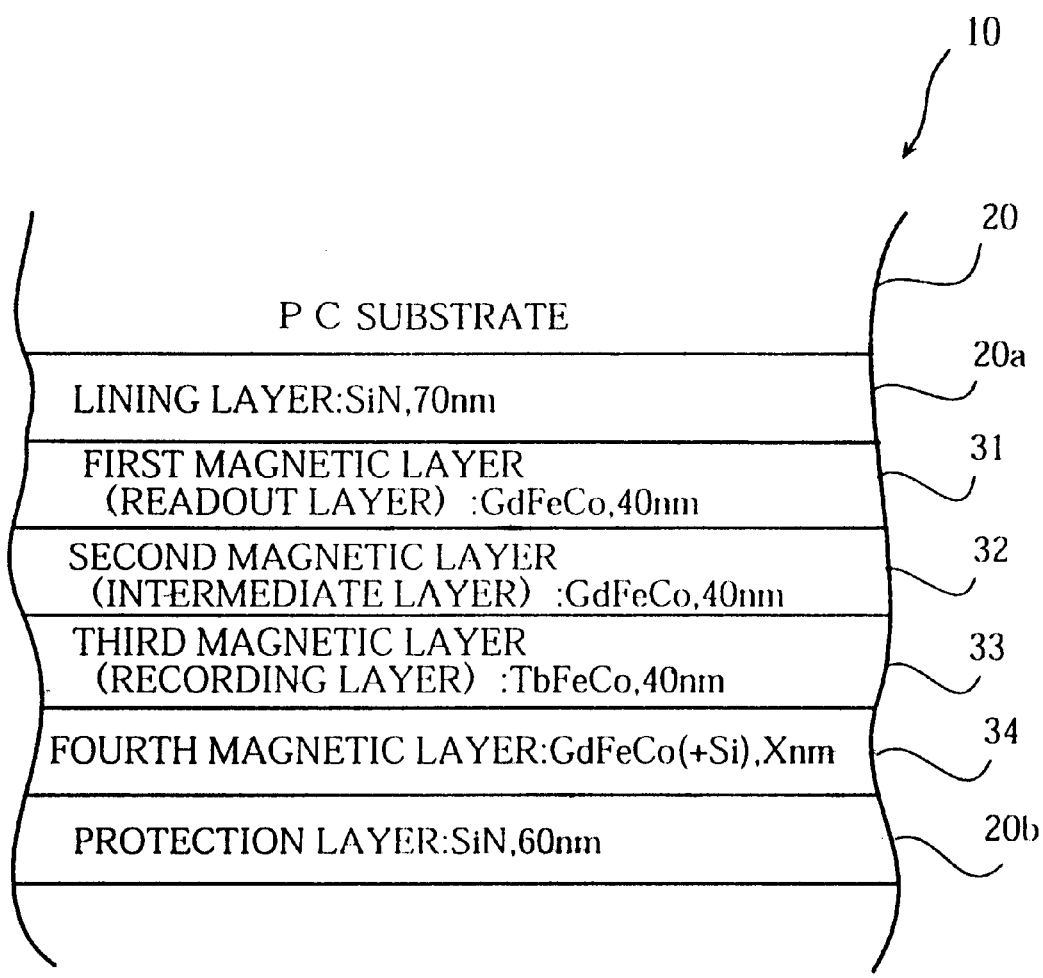
FIG. 1 is a schematic view showing the basic structure of a magneto-optical recording medium embodying the present invention.

Reference is first made to FIG. 1 illustrating the basic structure of a magneto-optical (MO) recording medium 10 embodying the present invention. As shown, the MO recording medium 10 includes a transparent substrate 20 made of polycarbonate. Though not shown, the transparent substrate 20 is provided with lands and grooves along which data-recording regions are arranged.

The MO recording medium 10 also includes a dielectric lining layer 20a, a first magnetic layer 31, a second magnetic layer 32, a third magnetic layer 33, a fourth magnetic layer 34 and a protection layer 20b. As shown in FIG. 1, these layers 20a, 31–34 and 20b are stacked, in the above-mentioned order, on the transparent substrate 20.

The lining layer 20a, formed directly on the substrate 20, is made by sputtering of SiN. The lining layer 20a is provided for facilitating the formation of the other layers 31–34 and 20b.

The first to the third magnetic layers 31–33, which are also made by sputtering, have the following functions. The first magnetic layer 31 serves as a readout layer from which stored data is read out. The third magnetic layer 33 serves as a data-recording layer to which new data is written. The second magnetic layer (or intermediate layer) 32, held between the first and the third magnetic layers, serves to copy the recording marks formed on the third magnetic layer 33 to the first magnetic layer 31. As in a conventional MO disk, this copying is performed by the exchange interaction which magnetically bonds the three layers 31–33. As will be described below, the magnetic properties of the three layers 31–33 are determined so that magnetically-induced super resolution by double mask RAD can be performed.

The protection layer 20b is provided for protecting the three layers 31, 32 and 33 from mechanical damage for example. The protection layer 20b is formed by sputtering of SiN.

The first magnetic layer (readout layer) 31 is made of a rare earth-transition metal amorphous alloy which can be magnetized perpendicularly to the first magnetic layer. This alloy has a high Curie temperature and exhibits relatively low coercivity. In the illustrated embodiment, the first magnetic layer 31 is made of $Gd_{23}Fe_{65}Co_{12}$.

The third magnetic layer (data-recording layer) 33 is also a perpendicularly magnetized layer. This layer is arranged not to be readily affected by externally applied magnetic fields, so that stable data retention is ensured. Specifically, the third magnetic layer 33 is arranged to have a low Curie temperature and high coercivity. In light of this, the third magnetic layer 33 is made of a rare earth-transition metal amorphous alloy which has, at room temperature, a TM-rich composition or compensation composition. In the preferred embodiment, the third magnetic layer 33 is made of $Tb_{23}Fe_{61}CO_{16}$.

The second magnetic layer (intermediate layer) 32 may be made of a rare earth-transition metal amorphous alloy (containing TbFe, GdFeCo, etc.) having a Curie temperature lower than the Curie temperatures of the first and the second magnetic layers 31 and 33. The alloy for forming the second magnetic layer 32 is RE-rich. By using such an alloy, the second magnetic layer 32 is made to have its axis of easy magnetization oriented parallel to the principal surfaces of the second magnetic layer 32. In other words, the axis of easy magnetization is arranged to extend longitudinally of the second magnetic layer 32. The alloy for the second magnetic layer 32 does not have a compensation temperature below its Curie temperature. In the preferred embodiment, the second magnetic layer is made of $Gd_{31}Fe_{67}CO_2$. Si is added to the $Gd_{31}Fe_{67}CO_2$ for causing the resulting second magnetic layer 32 to have a desired Curie temperature.

The thicknesses of the respective layers mentioned above are as follows: 70 nm for the lining layer 20a; 40 nm for the first magnetic layer 31; 40 nm for the second magnetic layer 32; 50 nm for the third magnetic layer 33; and 60 nm for the protection layer 20b. The Curie temperatures Tc1, Tc2 and Tc3 of the three magnetic layers 31–33 are about 300° C., 170° C. and 250° C., respectively.

In addition to the first to the third layers 31–33, the MO recording medium 10 includes a fourth magnetic layer 34 arranged between the third magnetic layer 33 and the protection layer 20b. The fourth magnetic layer 34 may be made of a rare earth-transition metal amorphous alloy having a Curie temperature Tc4.

The table of FIG. 2 shows several examples of alloy composition to be usable for forming the fourth magnetic layer 34. The table also shows the magnetic properties associated with the respective alloy compositions. The Curie temperatures Tc4 of Nos. 1–3 alloys are higher than the Curie temperature Tc3 of the third magnetic layer 33, whereas the Curie temperatures Tc4 of Nos. 4–9 alloys are lower than the 10 Curie temperature Tc3. Si is added to the Nos. 7–9 alloys, but not to the Nos. 1–6 alloys. The numbers appearing in the column of "Transition Temp." show temperatures at which the direction of the axis of easy magnetization is changed from "longitudinal" to "perpendicular", or "perpendicular" to "longitudinal."

Specifically, taking the No. 1 alloy ($Gd_{28.6}Fe_{60.0}CO_{11.4}$) for example, the transition temperature is 90° C. and this temperature is listed in the column of "Lon.→Per." This means that the axis of easy magnetization, which is directed longitudinally of the fourth magnetic layer 34 at room temperature, is reoriented at 90° C. to take a perpendicular position. Another example is No. 2 composition ($Gd_{25.1}Fe_{64.4}Co_{10.5}$) whose transition temperature is 260° C. This temperature is listed in the column of "Per.→Lon.", which means that the axis of easy magnetization, which is perpendicularly directed at room temperature, is reoriented at 260° C. to take a longitudinal position.

The inventor performed some tests to evaluate the advantages of the MO recording medium 10 incorporating the fourth magnetic layer 34. In performing this evaluation, the readout speed (circumferential speed of the tracks) was set at 7.5 m/s, and the length of each recording mark was 0.31 $\mu$m or 0.30 $\mu$m. The recording of data was performed by LIM or MFM. The results are shown in FIGS. 3–8.

Figure 3:
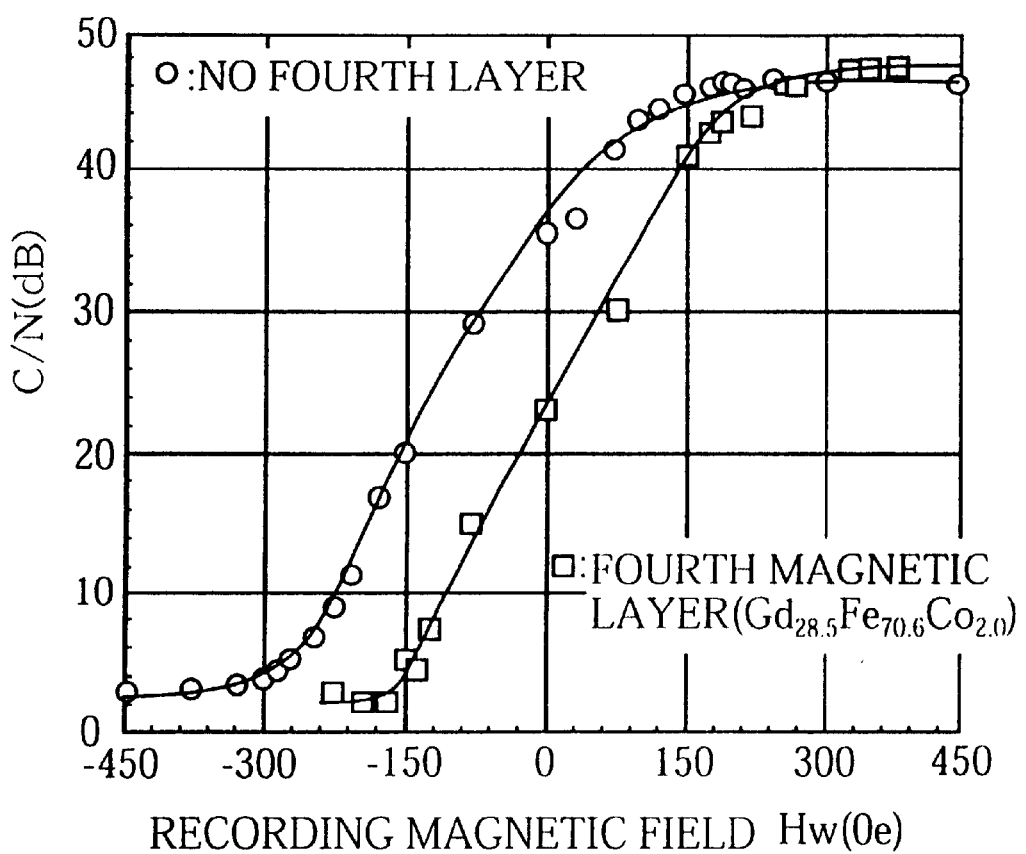
FIG. 3 is a graph showing the relation between the readout C/N and the recording magnetic field.

Referring to FIG. 3, the graph shows the relation between C/N(dB) and the recording magnetic field Hw(Oe). This graph was obtained by testing two different types of MO recording media. Specifically, one of them was a conventional MO recording medium having only three magnetic layers (corresponding to the first to the third magnetic layers 31–33 in FIG. 1) but no fourth magnetic layer. The other one was an MO recording medium provided with a fourth magnetic layer as shown in FIG. 1. The fourth magnetic layer was made of a $Gd_{28.5}Fe_{70.6}Co_{2.0}$ alloy (No. 4 composition in the table of FIG. 2) and had a thickness of 10 nm. The recording of data for this test was performed by LIM.

As seen from the graph of FIG. 3, in the MO recording medium with the fourth magnetic layer provided, the initial value of the recording magnetic field Hw (i.e., the value at the beginning of a data-recording operation) is rendered greater than the counterpart for the MO recording medium with no fourth magnetic layer. Consequently, the curve representing the Hw-C/N relation for the recording medium with the fourth magnetic layer rises more sharply than the curve for the other recording medium (having no fourth magnetic layer). This means that the carrier varies more sharply, and that the response to the recording magnetic field has been improved. Further, the graph shows that the maximum readout C/N for the recording medium with the fourth magnetic layer is greater than the maximum readout C/N for the other recording medium.

Figure 4:
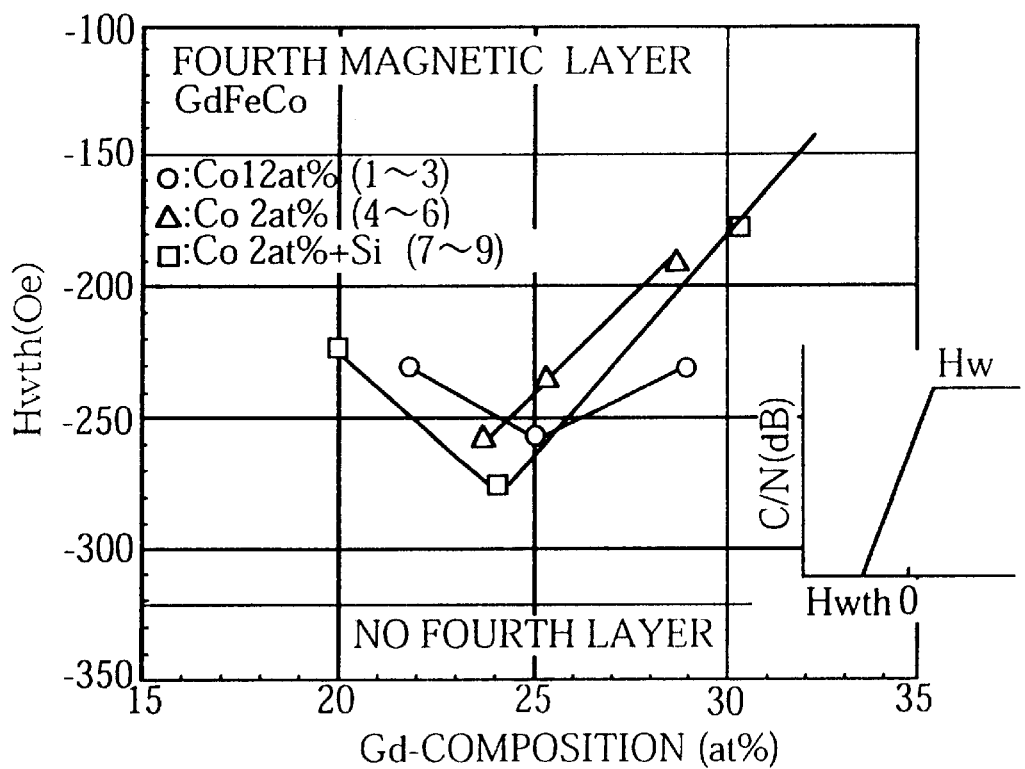
FIG. 4 is a graph showing the relation between the initial recording magnetic field and the Gd-composition.

FIG. 4 is a graph showing the relation between the magnetic field at the beginning of data-recording (Hwth) and the Gd-composition of the fourth magnetic layer. For comparison, the graph also shows a relation observed when no fourth magnetic layer is provided. When the Gd-composition is relatively low, the fourth magnetic layer tends to be TM-rich. When the Gd-composition is relatively high, the fourth magnetic layer tends to be RE-rich. In either case, as seen from the graph of FIG. 4, the initial recording magnetic field Hwth is greater than when no fourth magnetic layer is provided. A greater initial recording magnetic field Hwth is advantageous, as discussed above in reference to the graph of FIG. 3.

The graph of FIG. 4 also shows that the initial recording magnetic field Hwth takes a minimum value when the Gd-composition is about 25 at %. This means that the improvement of the sensitivity to the recording magnetic field is rendered minimum when the Gd-composition is about 25 at %. On the other hand, when the fourth magnetic layer becomes more RE-rich or TM-rich, the sensitivity to the recording magnetic field is improved. However, the inventor found that when the Gd-component of the fourth magnetic layer is over 35 at % or below 20 at %, the direction of the magnetic domains of the fourth magnetic layer will remain longitudinal even if the temperature is increased from room temperature to the Curie temperature. In this case, the recording magnetic field and the readout C/N fail to be improved.

Figure 5:
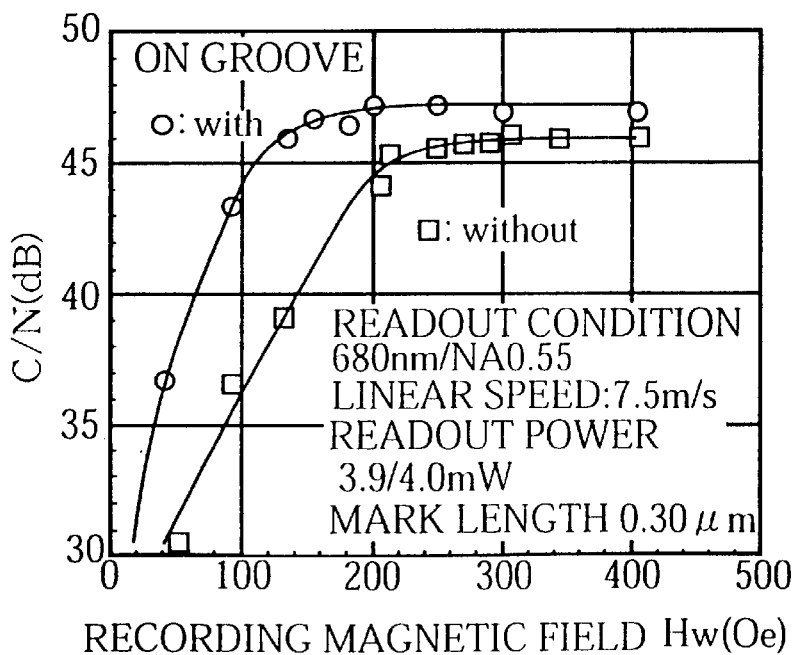
FIG. 5 is a graph showing the relation between the readout C/N and the recording magnetic field.

FIG. 5 is a graph showing the relation between the C/N and the recording magnetic field Hw by MFM. The results were obtained from a test in which use was made of two MO recording media; one of them was provided with a fourth magnetic layer made of $Gd_{30.2}Fe_{67.1}Co_{2.7}$+Si (No. 7 in the table of FIG. 2) and had a thickness of 7nm, while the other was provided with no fourth magnetic layer. The graph shows that the required magnetic field is reduced by no less than 100(Oe), and that the readout C/N is improved by no less than 1 dB.

Figure 6:
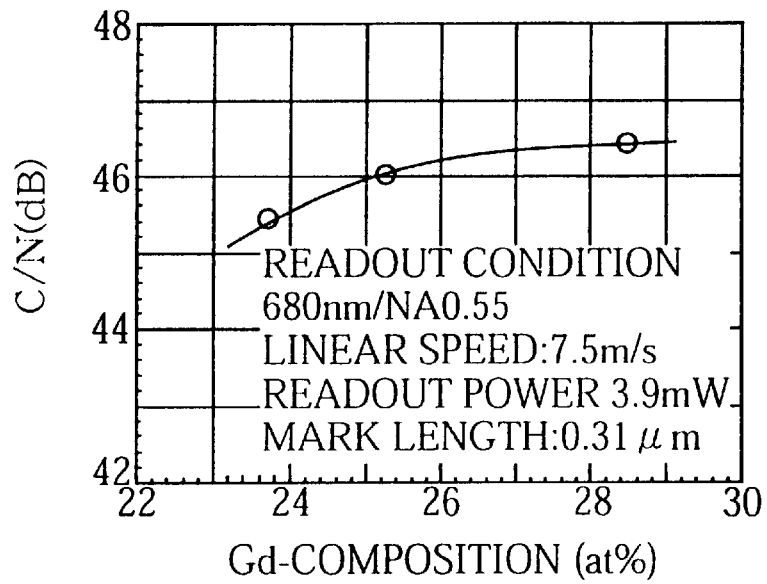
FIG. 6 is a graph showing the relation between the readout C/N and the Gd-composition.

FIG. 6 is a graph showing the relation between the C/N and the Gd-component. The results were obtained from a test in which use was made of three MO recording media each of which was provided with a fourth magnetic layer. The three fourth magnetic layers had the same thickness (10 nm) and were made of $Gd_{28.5}Fe_{70.6}Co_{2.0}$ (No. 4 in the table of FIG. 2), $Gd_{25.3}Fe_{72.8}Co_{1.9}$ (No. 5 in the table), $Gd_{23.8}Fe_{74.4}Co_{1.8}$ (No. 6 in the table), respectively. In each case, the Curie temperature Tc4 is smaller than the Curie temperature Tc3 of the third magnetic layer. The graph of FIG. 6 shows that the readout C/N improves as the Gd-component increases (namely, as the fourth magnetic layer is RE-richer).

Figure 7:
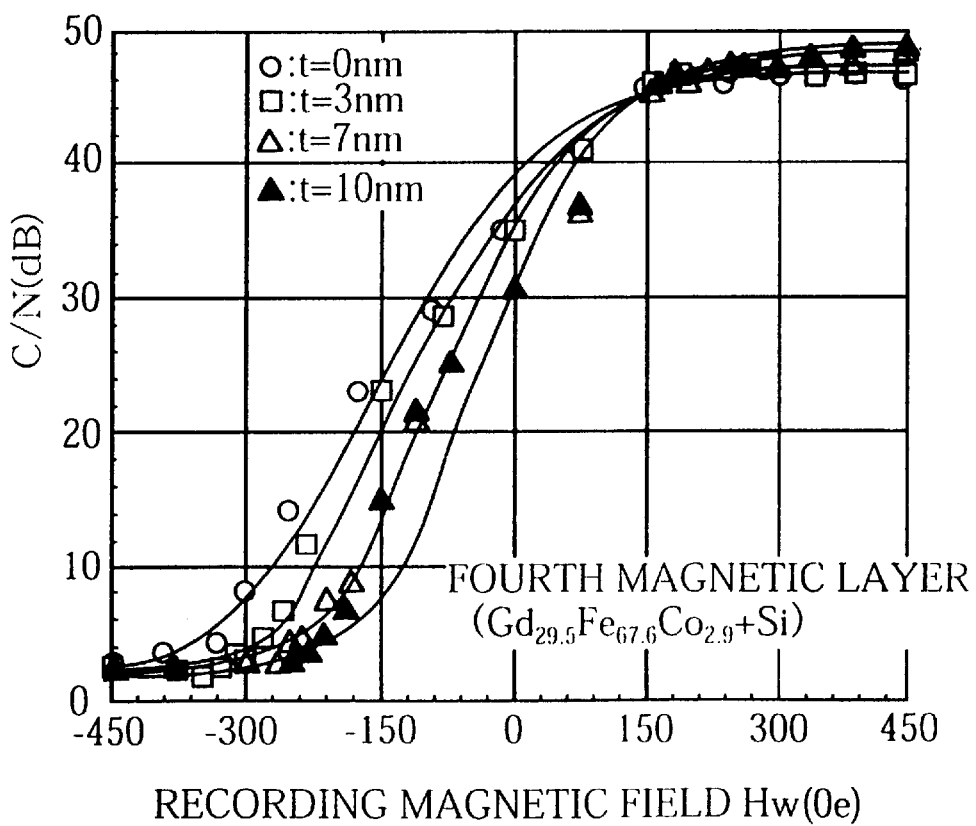
FIG. 7 is a graph showing the relation between the readout C/N and the recording magnetic field.

FIG. 7 is a graph showing the relation between the C/N and the recording magnetic field Hw. The results were obtained from a test in which the LIM method was employed and use was made of four MO recording media. One of the recording media was provided with no fourth magnetic layer, while the other three were provided with a fourth magnetic layer The three fourth magnetic layers were made of the same material ($Gd_{29.5}Fe_{67.6}Co_{2.9}$+Si, which is similar to No. 7 composition in the table of FIG. 2) and had a thickness of 3 nm, 7 nm and 10 nm, respectively.

Figure 8:
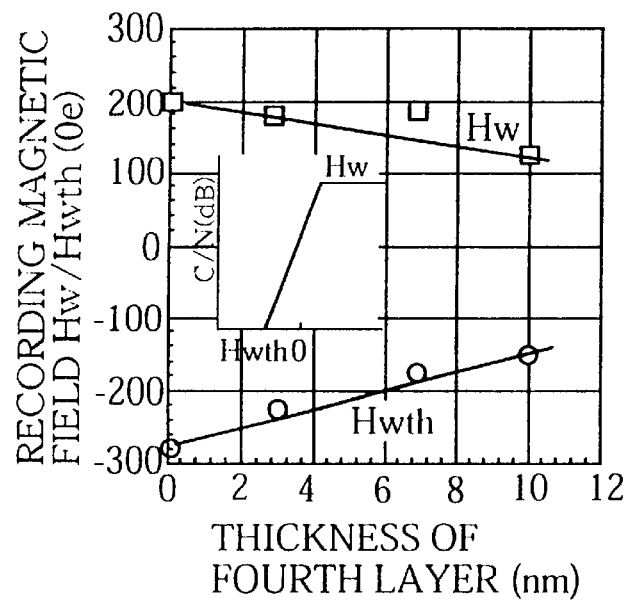
FIG. 8 is a graph showing the relation between the recording magnetic field and the thickness of the fourth layer
Figure 9:
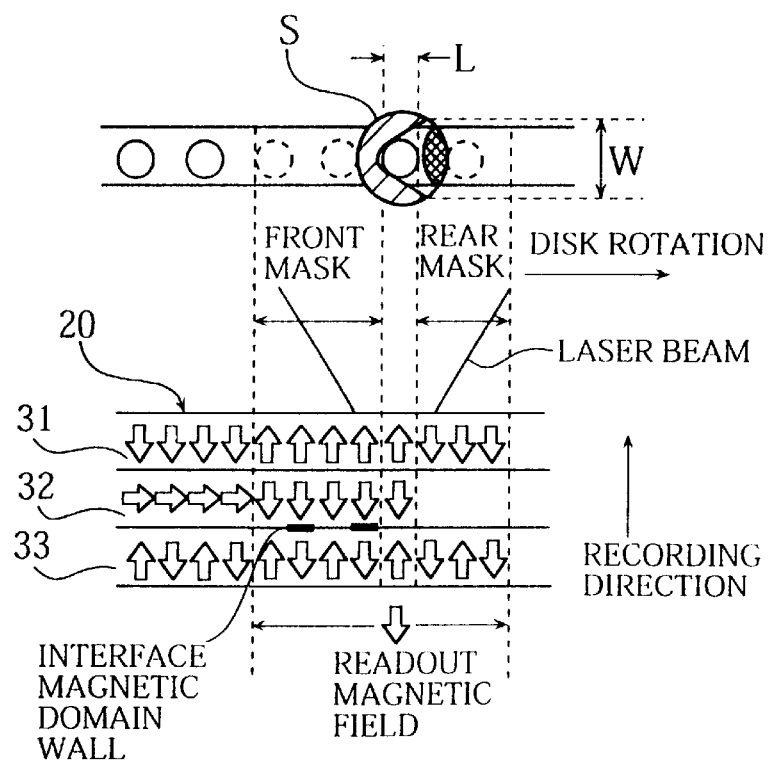
FIG. 9 is a schematic view showing a conventional structure of three magnetic layers of an MO disk used for performing magnetically-induced super resolution by double mask rear aperture detection.
Figure 10:
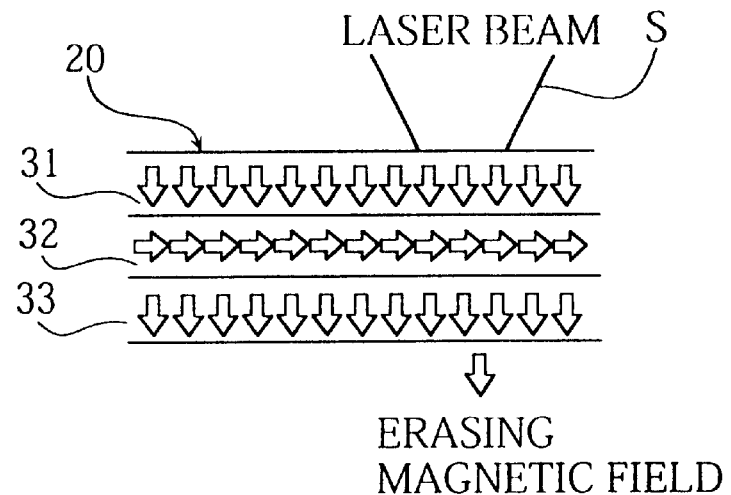
FIG. 10 is a schematic view showing how data is erased with the MO disk of FIG. 9.
Figure 11:
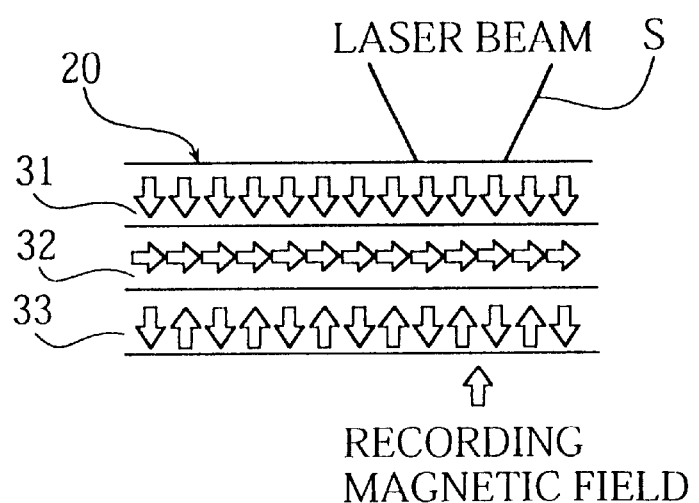
FIG. 11 is a schematic view showing how data is written to the MO disk of FIG. 9.

FIG. 8 is a graph which shows the relation between the initial recording magnetic field (Hwth) and the thickness of the fourth magnetic layer, and the relation between the magnetic field for saturation (Hw) and the thickness of the fourth magnetic layer. This graph is derived from the results shown in the graph of FIG. 7.

The graph of FIG. 8 shows that as the thickness of the fourth magnetic layer increases, the initial recording magnetic field (Hwth) decreases, which means the improvement in the sensitivity to the recording magnetic field. It was also observed that the readout C/N improves as the thickness of the fourth magnetic layer increases. However, it was found that noise increases (namely, the C/N decreases) when the thickness of the fourth magnetic layer is 20 nm.

The above facts lead to the following conclusions. When the fourth magnetic layer is made of a material which has an RE-rich composition and whose axis of easy magnetization is changed in direction from "longitudinal" to "perpendicular" as the temperature rises (as in Nos. 1, 4 and 7 compositions in the table of FIG. 2), the sensitivity to the recording magnetic field as well as the readout C/N is advantageously improved, whether the Curie temperature Tc4 is higher than the Curie temperature Tc3 or not.

The same advantages are obtained when the fourth magnetic layer is made of a material which has an TM-rich composition and whose axis of easy magnetization is changed in direction from "perpendicular" to "longitudinal" as the temperature rises (as in Nos. 3, 8 and 9 compositions in the table of FIG. 2).

To enjoy the above-mentioned advantages, it does not manner whether the Curie temperature Tc4 is higher or not than the Curie temperature Tc3. However, it should be noted that, to enable the super-resolution readout by the double mask RAD method, the four Curie temperatures Tc1, Tc2, Tc3 and Tc4 need to satisfy the following relations:

$Tc2 \leq Tc4$, $Tc4 \leq Tc3 < Tc1$, $Tc2 < Tc3$; or $Tc2 < Tc3 \leq Tc4 \leq Tc1$, $Tc3 < Tc1$.

The present invention being thus described, it is obvious that the same may be varied in many ways. For instance, one or more auxiliary magnetic layers may be added to improve or complement the function of the fourth magnetic layer. Such variations are not to be regarded as a departure from the spirit and scope of the present invention, and all such modifications as would be obvious to those skilled in the art are intended to be included within the scope of the following claims.

What is claimed is:

1. A magneto-optical recording medium for super resolution readout by double mask RAD comprising only four magnetic layers which include:

a first magnetic layer serving as a readout layer and made of a rare earth-transition metal amorphous magnetic material, a Curie temperature of the first magnetic layer being Tc1;

a second magnetic layer serving as an intermediate layer and made of a rare earth-transition metal amorphous magnetic material, the second magnetic layer having a rare earth metal magnetization-dominant composition and an axis of easy magnetization which is oriented longitudinally of the second magnetic layer at room temperature, the second magnetic layer having no compensation temperature below a Curie temperature Tc2 of the second magnetic layer;

a third magnetic layer serving as a recording layer and made of a rare earth-transition metal amorphous magnetic material, the third magnetic layer having a transition metal magnetization-dominant composition or compensation composition at room temperature, a Curie temperature of the third magnetic layer being Tc3; and a fourth magnetic layer formed on the third magnetic layer and made of a rare earth-transition metal amorphous magnetic material containing at least Gd, the fourth magnetic layer serving as a sensitivity improving layer for the recording layer, the fourth magnetic layer having, at room temperature, a rare earth metal magnetization-dominant composition and an axis of easy magnetization which is oriented longitudinally of the fourth magnetic layer, the axis of easy magnetization of the fourth magnetic layer being altered in direction to be oriented perpendicularly to the fourth magnetic layer as a temperature of the fourth magnetic layer rises to a Curie temperature Tc4 of the fourth magnetic layer, wherein no additional magnetic layer is formed on a side of the fourth magnetic layer opposite the third magnetic layer.

2. The magneto-optical recording medium according to claim 1, wherein the Curie temperatures Tc1, Tc2, Tc3 and Tc4 are determined so that $Tc2 \leq Tc4 \leq Tc3 < Tc1$, and $Tc2 < Tc3$.

3. The magneto-optical recording medium according to claim 1, wherein the Curie temperatures Tc1, Tc2, Tc3 and Tc4 are determined so that $Tc2 < Tc3 \leq Tc4 \leq Tc1$, and $Tc3 < Tc1$.

4. The magneto-optical recording medium according to claim 1, wherein the fourth magnetic layer contains 25–35 at % of Gd.

5. The magneto-optical recording medium according to claim 1, wherein the fourth magnetic layer has a thickness of no greater than 20 nm.

6. A magneto-optical recording medium for super resolution readout by double mask RAD comprising only four magnetic layers which include:

a first magnetic layer serving as a readout layer and made of a rare earth-transition metal amorphous magnetic material, a Curie temperature of the first magnetic layer being Tc1;

a second magnetic layer serving as an intermediate layer and made of a rare earth-transition metal amorphous magnetic material, the second magnetic layer having a rare earth metal magnetization-dominant composition and an axis of easy magnetization which is oriented longitudinally of the second magnetic layer at room temperature, the second magnetic layer having no compensation temperature below a Curie temperature Tc2 of the second magnetic layer;

a third magnetic layer serving as a recording layer and made of a rare earth-transition metal amorphous magnetic material, the third magnetic layer having a transition metal magnetization-dominant composition or compensation composition at room temperature, a Curie temperature of the third magnetic layer being Tc3; and a fourth magnetic layer formed on the third magnetic layer and made of a rare earth-transition metal amorphous magnetic material containing at least Gd, the fourth magnetic layer serving as a sensitivity improving layer for the recording layer, the fourth magnetic layer having, at room temperature, a transition metal magnetization-dominant composition and an axis of easy magnetization which is oriented perpendicularly to the fourth magnetic layer, the axis of easy magnetization of the fourth magnetic layer being altered in direction to be oriented longitudinally of the fourth magnetic layer as a temperature of the fourth magnetic layer rises to a Curie temperature Tc4 of the fourth magnetic layer, wherein no additional magnetic layer is formed on a side of the fourth magnetic layer opposite the third magnetic layer.

7. The magneto-optical recording medium according to claim 6, wherein at about the Curie temperature Tc3, the third and the fourth magnetic layers have coercivity Hc3 and coercivity Hc4, respectively, the coercivities Hc3, Hc4 and a recording magnetic field Hw are determined so that Hc3<Hw and Hc4<Hw.

8. The magneto-optical recording medium according to claim 6, wherein the Curie temperatures Tc1, Tc2, Tc3 and Tc4 are determined so that $Tc2 \leq Tc4 \leq Tc3 < Tc1$, and $Tc2 < Tc3$.

9. The magneto-optical recording medium according to claim 6, wherein the Curie temperatures Tc1, Tc2, Tc3 and Tc4 are determined so that $Tc2 < Tc3 \leq Tc4 \leq Tc1$, and $Tc3 < Tc1$.

10. The magneto-optical recording medium according to claim 6, wherein the fourth magnetic layer contains 20–25 at % of Gd.

* * * * *